United States Patent
Law et al.

(10) Patent No.: US 12,268,136 B2
(45) Date of Patent: Apr. 8, 2025

(54) FAÇADE CASSETTE

(71) Applicant: DESIGNLAW LIMITED, London (GB)

(72) Inventors: Alistair Law, London (GB); Ralph Wilson, London (GB)

(73) Assignee: Designlaw Limited, London (GB)

( * ) Notice: Subject to any disclaimer, the term of this patent is extended or adjusted under 35 U.S.C. 154(b) by 0 days.

(21) Appl. No.: 18/546,458

(22) PCT Filed: Feb. 15, 2022

(86) PCT No.: PCT/GB2022/050404
§ 371 (c)(1),
(2) Date: Aug. 15, 2023

(87) PCT Pub. No.: WO2022/175650
PCT Pub. Date: Aug. 25, 2022

(65) Prior Publication Data
US 2024/0122126 A1  Apr. 18, 2024

(30) Foreign Application Priority Data
Feb. 16, 2021 (GB) ................................ 2102143

(51) Int. Cl.
*A01G 9/02* (2018.01)
(52) U.S. Cl.
CPC .................................. *A01G 9/025* (2013.01)
(58) Field of Classification Search
CPC ... A01G 9/02; A01G 9/03; A01G 9/12; A01G 9/022; A01G 9/023; A01G 9/025;
(Continued)

(56) References Cited

U.S. PATENT DOCUMENTS 5,626,927 A * 5/1997 Reed ................ A01G 9/026
428/34.1
8,966,819 B1 * 3/2015 Cosmann ............ A01G 9/023
47/83
(Continued)

FOREIGN PATENT DOCUMENTS

DE  202021103610 U1 * 9/2021 .............. E04F 13/12
EP  3419407  5/2021
(Continued)

OTHER PUBLICATIONS

International Application No. PCT/GB2022/050404, International Search Report and Written Opinion mailed May 2, 2022, 10 pages.

*Primary Examiner* — Ebony E Evans
(74) *Attorney, Agent, or Firm* — Leber IP Law; Shelly M. Fujikawa

(57) ABSTRACT

A façade cassette for supporting vegetation growth is disclosed, the façade cassette comprising a first panel and a second panel which is provided with openings for vegetation to grow through, wherein: the first panel is connectable to a supporting structure; the second panel is mounted on the first panel for movement between an installed position and an open position; the first panel and the second panel are configured to define a housing therebetween for a substrate; each panel comprises a face and two sides extending from opposing peripheral regions of the face to provide a pair of opposing sides; and each side of the pair of opposing sides of the first panel is configured to be connectable to the supporting structure. A façade system comprising a plurality of the façade cassettes and an installation method are also disclosed.

13 Claims, 10 Drawing Sheets

(58) Field of Classification Search
CPC .................. A01G 9/241; A01G 9/0295; A01G 2009/003; A01G 31/00; A01G 31/02; A01G 31/06
See application file for complete search history.

(56) References Cited

U.S. PATENT DOCUMENTS

| | | | |
|---|---|---|---|
| 10,980,188 B2 * | 4/2021 | Duncan | .................. A01G 9/025 |
| 2018/0295790 A1 * | 10/2018 | Bernardes | ............... E04H 17/20 |

FOREIGN PATENT DOCUMENTS

| | | | | |
|---|---|---|---|---|
| FR | 2857396 | | 1/2005 | |
| KR | 20140096797 | | 7/2015 | |
| WO | 2010025837 | | 3/2010 | |
| WO | WO-2017146628 A1 * | 8/2017 | ............. | A01G 9/025 |

* cited by examiner

FAÇADE CASSETTE

RELATED APPLICATIONS

This application is a national phase entry of International Patent Application No. PCT/GB2022/050404, filed Feb. 15, 2022, which claims priority from Great Britain Patent 2102143.1 filed Feb. 16, 2021, the entire disclosures of which are incorporated herein by reference.

The present invention relates to a façade cassette for supporting vegetation growth. It also relates to a façade system comprising a plurality of the façade cassettes and to a method for installing the façade cassette or the façade system.

Façade panels and other rigid building panels are known which include a layer which supports vegetation growth. These can be mounted onto buildings or walls, or used in the construction of these, to provide a "green" wall by which vegetation grows on the wall itself.

There are many advantages to having vegetation growing on structures and buildings, including increasing urban biodiversity, improving health and well-being for urban citizens, reducing urban heat island effects, providing acoustic attenuation and thermal regulation, improving air quality by removal of pollutants, removing carbon dioxide in the air and replacing it with oxygen and general architectural/aesthetic benefits. In addition, it can provide habitats for plant and animal life in cities.

According to the present invention in a first aspect there is provided a façade cassette for supporting vegetation growth, the façade cassette comprising a first panel and a second panel which is provided with openings for vegetation to grow through, wherein: the first panel is connectable to a supporting structure; the second panel is mounted on the first panel for movement between an installed position and an open position; the first panel and the second panel are configured to define a housing therebetween for a substrate; each panel comprises a face and two sides extending from opposing peripheral regions of the face to provide a pair of opposing sides; each side of the pair of opposing sides of the first panel is configured to be connectable to the supporting structure.

The second panel is mounted on the first panel for movement between an installed position and an open position to enable the substrate to be easily and safely accessed, removed and replaced if necessary, without the need to remove or disconnect any other components. A key concern of building owners is the impact of dead vegetation.

Preferably, the second panel is mounted on the first panel for movement about an axis extending through the pair of opposing sides of the first panel and the pair of opposing sides of the second panel.

Since a key concern of building owners is the occurrence and impact of dead vegetation, mounting the second panel for movement about an axis extending through the pair of opposing sides of the first panel and the pair of opposing sides of the second panel has the advantage that, in the event of the vegetation dying, it can be cut back and the façade cassette can be easily opened using a pivoting mechanism to access and replace the substrate, without having to disconnect components which might fall or be lost from the façade. The pivoting mechanism may provide a hinge on which the second panel is moveable between the installed position and the open position.

Alternative ways of mounting the second panel on the first panel include the use of hooks and lugs or the use of screw fixings, for example, although it is not preferred to use additional components such as screws which require disconnection from the façade cassette.

When the façade cassette is connected to a supporting structure, the first panel is a rear panel and the second panel is a front panel. Also, the first panel may be an inner panel and the second panel may be an outer panel which substantially wraps around the inner panel.

In a preferred embodiment, the façade cassette is installed in a substantially vertical orientation with the faces of each panel being oriented in a substantially vertical direction and the pair of opposing sides of each panel being oriented in a substantially vertical direction.

Each panel may be provided with additional sides extending from other peripheral regions of the face. For example, the first panel may be provided with one or two additional sides and the second panel may be provided with one additional side. When the façade cassette is installed in a substantially vertical orientation, any additional sides of each panel are preferably oriented in a substantially horizontal direction.

An additional side of the second panel is preferably a lower side in use of the façade cassette: it may be configured to retain the substrate in the housing, such that the substrate does not slide from the housing.

An additional side of the second panel is preferably spaced from the face of the first panel to provide a channel for water to pass through.

In accordance with the present invention, a side extending from a peripheral region of a face of a panel includes a side extending from a peripheral edge of a face of a panel.

If required for structural reasons, stiffeners may be fixed (for example, by bonding) to the first panel and/or to the second panel to prevent warping of the face of the panel, for example.

The façade cassette is designed for the cultivation of vegetation primarily on the walls or sides of buildings or structures, for example on the exterior wall or an interior wall of a building. It can also be installed in a horizontal orientation, for example to cultivate vegetation on a roof, or in any orientation between horizontal and vertical.

The façade cassette can also be installed indoors with an artificial lighting system replacing or supplementing natural light to support plant growth. It may also be used in temporary applications (such as for construction hoarding panels or at festivals and expositions) or for visual and acoustic screening for building plant equipment such as transformers and air-handling units.

The opposing sides of the first panel and/or the second panel preferably extend in a first direction from the peripheral regions of the face of the relevant panel, the first direction being towards the supporting structure in use of the façade cassette. This first direction is preferably substantially perpendicular to the peripheral regions of the face of the panel.

Any additional sides of the first panel and/or the second panel preferably extend in the first direction from the peripheral regions of the face of the relevant panel.

In a preferred embodiment, the face of the first panel and/or the face of the second panel is substantially planar, the face extending in second and third directions which are substantially perpendicular to one another and also to the first direction.

When the façade cassette is connected to the supporting structure, whereby the first panel is a rear panel and the second panel is a front panel, the opposing sides of the first panel and/or the second panel preferably extend rearwardly; the opposing sides therefore extend from the face of each panel towards the supporting structure. The supporting structure does not form part of the present invention.

The second panel is preferably mounted on the first panel for rotational movement or for translational and rotational movement between the installed position and the open position, the rotational movement being about the axis extending through the pair of opposing sides of the first panel and the pair of opposing sides of the second panel.

This axis may extend through end regions of the pair of opposing sides of the first panel and the pair of opposing sides of the second panel.

Preferably these end regions of the pair of opposing sides of each panel are lower end regions in use of the façade cassette. The provision of a pivoting mechanism toward the base of the façade cassette allows an operator to work with gravity since the second panel may not have to be held open and the substrate may be more easily placed or removed.

The pair of opposing sides of the first panel are connectable to the supporting structure. Each of the opposing sides of the first panel may be provided with at least one aperture for connection to the supporting structure, although other connection means are envisaged which do not require the presence of these apertures. For example, each of the opposing sides may be provided with bolts or pins for connection to the supporting structure.

The aperture(s) may extend from the edge of the side of the first panel to define a notch or slot or channel. The aperture(s) may be substantially T-shaped or L-shaped, although other shapes may be used. An aperture may be provided in each end region of the opposing sides of the first panel for connection to the supporting structure.

In a preferred embodiment, there is at least one aperture in each of the opposing sides of the first panel with the aperture being configured to hook onto the supporting structure. In one example, there are two apertures in each of the opposing sides of the first panel for connection to the supporting structure.

The pair of opposing sides of the second panel may be releasably connectable to the supporting structure. The pair of opposing sides of the second panel may be connected to the supporting structure in the installed position only. In this case, to move the second panel from the installed position to the open position, the second panel is disconnected from the supporting structure and moved (preferably by rotation or by translation and rotation) into the open position.

Each of the opposing sides of the second panel may be provided with at least one aperture for connection to the supporting structure, although other connection means are envisaged which do not require the presence of these apertures. For example, each of the opposing sides may be provided with bolts or pins for connecting to the supporting structure.

The aperture(s) may extend from the edge of the side of the second panel to define a notch or slot or channel. The aperture(s) may be substantially T-shaped or L-shaped, although other shapes may be used.

In a preferred embodiment, there is at least one aperture in each of the opposing sides of the second panel with the aperture being configured to hook onto the supporting structure. In one example, there is one aperture in each of the opposing sides of the second panel for connection to the supporting structure.

When the second panel is in the installed position, each of the opposing sides of the second panel is preferably located adjacent to and externally of one of the opposing sides of the first panel.

The opposing sides of each panel provide structural stiffness and the overlapping of each opposing side of the second panel with an adjacent opposing side of the first panel contributes to the structural stiffness of the façade cassette in the installed position.

The opposing sides of the second panel each have a first end region which is preferably provided with the aperture for connection to the supporting structure and an opposite, second end region through which preferably passes the axis for movement of the second panel relative to the first panel. Preferably there is no aperture for connection to the supporting structure in the second end region of each opposing side of the second panel. The first end region may be wider than the second end region, the width of a side being the dimension in the first direction mentioned above.

The opposing sides of the first panel each have a first end region which is preferably provided with an aperture for connection to the supporting structure and an opposite, second end region which is preferably provided with an aperture for connection to the supporting structure. The first end region may have substantially the same width as the second end region.

In a preferred embodiment, when the second panel is mounted on the first panel in the installed position, the wider, first end regions of the opposing sides of the second panel substantially fully overlap the adjacent, first end regions of the opposing sides of the first panel, while the narrower, second end regions of the opposing sides of the second panel only partially overlap the adjacent, second end regions of the opposing sides of the first panel. In this regard, the sides of the panels are considered to overlap when viewed in a direction which is perpendicular to these sides; for example, in a direction which is parallel to the faces of the panels.

In use of the façade cassette, the first end region of an opposing side of a panel is preferably an upper end region and the second end region is preferably a lower end region.

The second panel may be mounted on the first panel in such a way as to provide a lift and tilt movement between the installed position and the open position. In this respect, to move the second panel into the open position, the second panel may be lifted from the installed position and subsequently tilted into the open position relative to the first panel. This is one example of the second panel being mounted on the first panel for translational and rotational movement. The first panel is preferably fixed against movement as a result of its connection to the supporting structure.

Alternatively, the second panel may be mounted on the first panel in such a way as to provide a rotational movement between the installed position and the open position.

The second panel may be mounted on the first panel for rotation about a pivoting means. The pivoting means may comprise an elongate pivot member such as a shaft, pin, post, bolt or screw passing through adjacent sides (of the pairs of opposing sides) of the first panel and the second panel. A single pivot member may extend between opposing sides of the second panel (thereby passing through opposing sides of the first panel). Alternatively, two co-axial pivot members may be provided, each one at adjacent sides (of the pairs of opposing sides) of the first panel and the second panel.

In a preferred embodiment, the second panel is mounted on the first panel by a pivoting means comprising a pivot member or pivot members extending in the direction of the axis and fixed to the opposing sides of either the first panel or the second panel. The pivoting means also comprises an aperture, provided in the opposing sides of the other of the first panel or the second panel.

For rotational movement, the aperture may be sized to fit the diameter of a pivot member.

For translational and rotational movement, the aperture is sized to fit the diameter of a pivot member and also has an elongate shape.

Preferably the aperture is a slot extending in two directions to facilitate the translational and rotational movement of the second panel, the two directions each being substantially perpendicular to the direction of the axis. Preferably the slot does not extend from the edge of the side of the panel but is contained within the side of the relevant panel. In one example, the slot extends in two directions which are substantially perpendicular to one another. The slot may be L-shaped although the invention is not limited to this. When the slot is L-shaped, its vertical component is preferably parallel to the face of the second panel and its horizontal component preferably extends from the vertical component in the first direction (ie. rearwardly in use of the façade cassette).

The housing defined between the first panel and the second panel is accessible for ready placement of a substrate when the second panel is in the open position.

Preferably the housing is defined between the face of the first panel and the face and sides of the second panel.

In the installed position, the face of the first panel and the face of the second panel are preferably substantially parallel.

In the open position, the face of the second panel is generally distanced from the face of the first panel compared to the installed position.

When the second panel is in the open position, an angle between the face of the second panel and a plane parallel to the face of the first panel or parallel to the face of a supporting structure may be 15 to 90 degrees, preferably 30 to 60 degrees.

A gap may be provided between the faces of the first panel and the second panel when the second panel is in the installed position, the gap providing access to the housing for irrigation.

The façade cassette may comprise at least one fluid conduit for irrigation.

The façade cassette preferably comprises a substrate located in the housing, ready for use.

The substrate comprises a growing medium for vegetation. It may be hydrophilic and absorbent so as to retain water. The substrate may comprise one or more layers. The substrate is preferably provided with seeds, either embedded within or fixed to a surface thereof. In this respect, the seeds may be either adhered directly to a surface of the substrate or embedded in the substrate, adjacent a surface of the substrate.

The substrate may be a root mat comprising a fibrous fabric material, such as a fibrous horticultural felt, often referred to as a moisture retention mat, which typically has a density of between 300 g/m$^3$ to 900 g/m$^3$. Alternatively, the root mat may comprise stone wool or mineral wool. Such a layer may be referred to as a root mat layer. The root mat layer may be structurally supported in the housing defined between the first and second panels. The root mat layer is less dense and holds together as one piece, for the same water retention properties, than conventional materials used as such a substrate (soil, for example). The root mat layer may comprise a plurality of layers of the root mat material.

In addition to the substrate, a layer of seeds may be provided in the housing, between the substrate and the face of the second panel. This layer of seeds may be a sheet of seeds. The sheet may be a paper sheet. The layer of seeds may be adhered to the substrate. Additionally or alternatively, seeds may be provided in the growing medium of the substrate.

In another embodiment, the façade cassette may support vegetation growth from pre-grown plants rather than from seeds. These plants are pre-grown plug-in plants, for example. A suitable substrate is provided as a growing medium.

Other layers may also be provided in the housing, for example a film layer may be provided to reduce evaporation of water; this film layer may be semi-permeable to water. Seeds may be affixed to such a film layer.

The first panel of the façade cassette may comprise a first side extending from a peripheral region of the face and located between the pair of opposing sides of the first panel, the first side optionally having a lip portion distal the face of the first panel. The first side may extend substantially the full distance between the opposing sides of the first panel.

When present, the lip portion preferably extends substantially the full length of the first side. The face, the first side and the lip portion of the first panel may provide a step-shape in profile.

The lip portion may be configured to abut or overlap the first panel of an adjacent façade cassette, for example to abut or overlap the first panel of a façade cassette mounted above the façade cassette in question. The feature of the lip portion seeks to prevent the ingress of water behind the façade cassettes in use.

The first panel of the façade cassette may comprise a second side extending from a peripheral region of the face and located between the pair of opposing sides of the first panel. The second side may be configured such that it is adjacent a lip portion of a neighbouring façade cassette.

In an embodiment where the first panel is an inner panel and the second panel is an outer panel which substantially wraps around the inner panel, the opposing sides of the outer panel at least partially overlap the opposing sides of the inner panel. Preferably, any additional sides of the outer panel do not overlap the inner panel, although they may abut the inner panel.

According to the present invention in a second aspect there is provided a façade system comprising a plurality of the façade cassettes which are positioned such that peripheral edges of the faces of the second panels are adjacent one another.

According to the present invention in a third aspect there is provided a method for installing the façade cassette, the method comprising, in no particular order: connecting at least the first panel of the façade cassette to a supporting structure; placing a substrate in the housing of the façade cassette; and optionally providing an irrigation apparatus to supply water to the substrate.

The façade cassette may be installed on the supporting structure with an irrigation apparatus to provide water to the vegetation. This water may supplement water from precipitation, naturally and/or via a rainwater-harvesting system, or in arid regions it may be the sole source of water for the vegetation.

The façade cassette may hence comprise an irrigation apparatus for supplying a liquid containing water and, optionally, nutrients to the housing of the façade cassette for absorption by the substrate, thereby germinating seeds present in the housing and watering plants grown from the seeds or pre-grown and planted in the housing.

The irrigation apparatus may be gravity fed and hence may be designed to form part of a larger gravity fed irrigation system for multiple façade cassettes.

The façade cassette may be provided with one or more fluid conduits, such as a pipe that, when the façade cassette is in use, directs water toward the roots of the vegetation, preferably by directing water toward the substrate.

The fluid conduit may be a pipe with a plurality of holes provided along the length of the pipe for allowing the liquid to pass from the pipe to the housing of the façade cassette. Such an irrigation system may be referred to as a drip system.

The fluid conduits may be configured to receive the liquid from a source, and may be configured to distribute the liquid via the gap provided between the faces of the first panel and the second panel when the second panel is in the installed position, the gap providing access to the housing and therefore to the substrate therein.

When the façade cassette is oriented substantially vertically, the gap is preferably at the top of the façade cassette so that the liquid can flow under gravity through the substrate in use.

The fluid conduit or fluid conduits may be removably connected to the façade cassette in or adjacent the gap, for example by the use of one or more clips. The fluid conduit or fluid conduits may be removably connected to the face of the first panel.

The liquid may be collected and pumped back to the fluid conduit creating a closed loop. The liquid may be collected in one or more collection tanks, which would typically be provided as a part of the broader irrigation system for multiple façade cassettes rather than for each façade cassette. The liquid may be pumped using one or more pumps, which once again would typically be provided as a part of the broader irrigation system for multiple façade cassettes.

Initial irrigation of the substrate and the seeds may cause germination of the seeds so that plants may grow through the openings of the second panel to the light, whether this be sunlight or artificial light. The liquid may be closely monitored to provide sufficient nutrients and water to the plants (which may instead be pre-grown and planted within the façade cassette).

The façade cassette may comprise at least one bar located in the housing. The bar preferably extends lengthwise in a direction which extends between the pair of opposing sides of the second panel in the installed position. The bar preferably extends substantially parallel to the axis extending through the pair of opposing sides of the first panel and the pair of opposing sides of the second panel.

In use of the façade cassette, the bar preferably extends in a substantially horizontal direction. The bar seeks to slow the passage of liquid flowing through the substrate and/or to collect liquid, thereby promoting more even growth of plants across the face of the second panel. The bar is preferably configured both to collect liquid inside the housing and to permit liquid to pass through the housing.

The bar may be located in a central region of the housing, with the second panel in the installed position. The bar may be located approximately midway between upper and lower edges of the face of the first or second panel. In this way, liquid is collected approximately halfway down the housing as well as at the bottom of the housing. The bar may be an intermediate, substantially horizontal bar.

The bar may be located in an upper region of the housing, with the second panel in the installed position. The bar may be located approximately a third of the way down from the upper edge of the face of the first or second panel to the lower edge of the face of the respective first or second panel.

The bar may be located in a lower region of the housing, with the second panel in the installed position. The bar may be located approximately a third of the way up from the lower edge of the face of the first or second panel to the upper edge of the face of the respective first or second panel.

In an embodiment with two bars located in the housing, one bar may be located in an upper region of the housing, with the second panel in the installed position. This bar may be located approximately a third of the way down from the upper edge of the face of the first or second panel to the lower edge of the face of the respective first or second panel. The other bar may be located in a lower region of the housing, with the second panel in the installed position. This bar may be located approximately a third of the way up from the lower edge of the face of the first or second panel to the upper edge of the face of the respective first or second panel.

In one embodiment, the bar is attached (by welds, screws or other connecting means) to the pair of opposing sides of the second panel. Alternatively, or in addition, the bar may be attached (by welds, screws or other connecting means) to the face of the second panel.

In another embodiment, the bar is attached (by welds, screws or other connecting means) to the face of the first panel.

In yet another embodiment, the bar is unattached to the façade cassette and is adapted to be held in place by the substrate. For example, the bar is wedged between two substrate pieces or located in a notch cut in a single substrate piece (eg a substrate block)

The bar may extend 75 to 100% of the distance between the pair of opposing sides of the second panel. The bar preferably extends 90 to 100% of the distance between the pair of opposing sides of the second panel.

Each bar may be formed of a plurality of sections along its length with spaces being provided between the sections.

The bar may be provided with apertures for liquid to pass through. For example, the bar may be perforated.

The bar may be made of metal. The bar may be made of the same material as the first and/or second panels.

In one embodiment, the bar is spaced from the face of the first panel and/or the face of the second panel to provide a channel for water to pass through. The width of the bar is therefore less than the distance between the faces of the first and second panels when the second panel is in the installed position. In this embodiment, the bar may be provided with apertures or it may be solid, meaning that it is not provided with apertures.

In another embodiment, the width of the bar is substantially the same as the distance between the faces of the first and second panels when the second panel is in the installed position. In this embodiment, the bar may be provided with apertures or may comprise multiple sections with spaces between them along the length of the bar.

The profile of the bar may be rectangular, circular, square or any other shape. The profile and cross-sectional area of the bar may be uniform or non-uniform along the length of the bar.

The first and second panels are preferably made of metal although they could be made of other materials. The advantage of using metal to make the panels is that the panels may each be formed from a single sheet of metal which is sufficiently ductile to be bent to form the face and sides of each panel. Further, a metal panel is sufficiently strong to support the vegetation growing in and from the façade cassette. The ductility and workability of metal can allow for a face of a panel to be curved or angled. Metal is also significantly more resistant to frosts than ceramic alternatives, thus extending the working life of the façade cassette. Further, metal is non-combustible in comparison to other materials such as plastics.

The openings provided in the second panel for vegetation to grow through provide porosity to the second panel. The openings are provided in at least the face of the panel. The porous face of the second panel may be provided by a metal foam, a perforated metal sheet, a 3D printed metal fabric or a fine metal mesh.

In a preferred embodiment, the openings provided in the second panel for vegetation to grow through are formed by perforations in at least the face of the panel. The perforations may be uniformly or irregularly formed. Patterns of perforations may be formed. Such patterns may differ between façade cassettes.

When pre-grown plants are provided in the housing of the façade cassette, they may be installed when the second panel is in the open position. Alternatively, pre-grown plants may be installed by planting them through the openings in the second panel (in the installed position or the open position), in which case the openings are sufficiently large for pre-grown plants, such as plug-in plants, to be inserted into the housing through the openings.

The façade cassette may be configured to have the first and second panels oriented vertically, or horizontally, or at an incline intermediate the vertical and the horizontal. The first panel and/or the second panel may have a planar surface or a non-planar surface such as a curved or angular surface.

The façade cassette may be arranged to have dimensions, strength, weight and/or any other property similar to that of standard façade panels (ie. those not configured to support vegetation) used in the façade industry. By aligning such properties, the layer façade panel may be handled and installed using standard techniques, thus requiring no new expertise of the workforce. Also, the façade cassettes may be used adjacent standard façade panels to provide visual continuity across a whole façade. The non-vegetation-supporting façade panels may be backlit, or used as shading screens, for example.

In terms of standard techniques for installing façade panels, sub-frames of mullions, brackets and panel carriers are installed on the wall of building, for example. Façade panels are mounted on these sub-frames. A sub-frame installed on a wall is an example of the supporting structure, wherein at least the first panel of the façade cassette is connectable to the supporting structure.

The present invention will now be described, by way of example only, with reference to the accompanying diagrammatic drawings in which.

Figure 1:
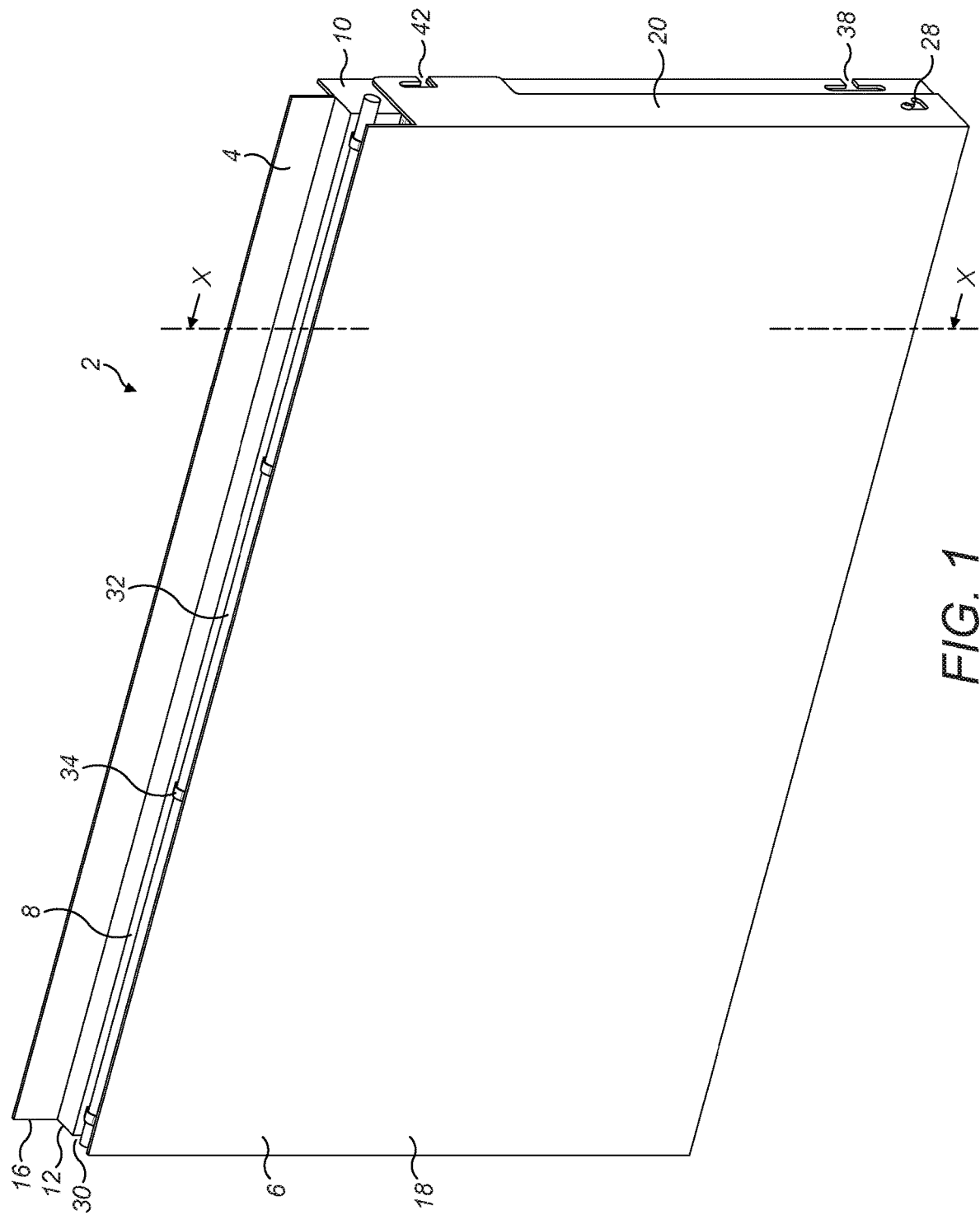
FIG. 1 is a front perspective view of a façade cassette.
Figure 2:
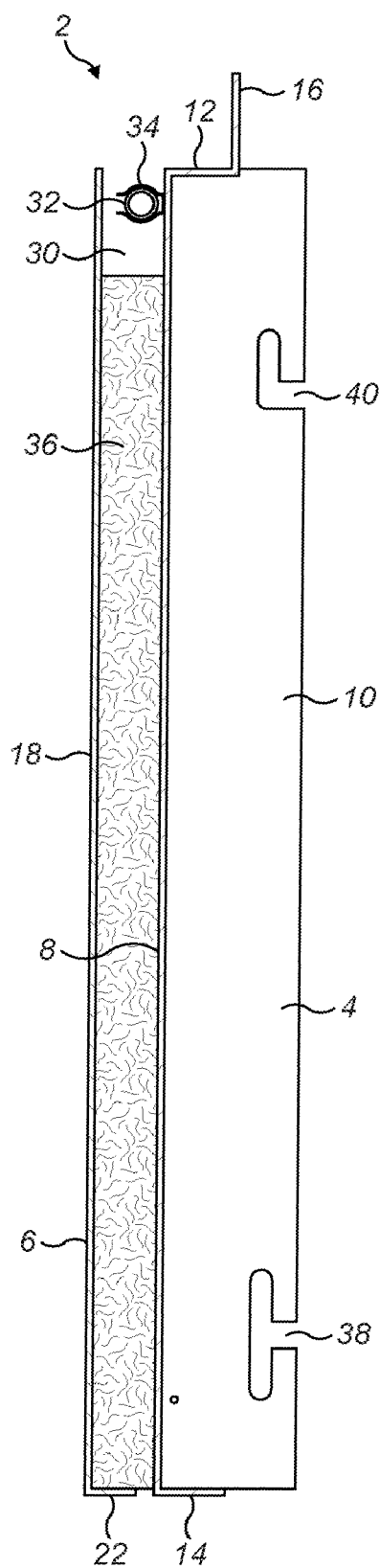
FIG. 2 is a cross-sectional view taken along line X-X of FIG. 1 in a first embodiment of a façade cassette.

Referring to FIGS. 1 and 2, a façade cassette 2 is configured to support vegetation growth. Façade cassette 2 comprises a first, rear panel 4 and a second, front panel 6. In the embodiment of FIG. 1, front panel 6 is an outer panel which substantially wraps around rear panel 4 which is an inner panel.

Rear panel 4 has a face 8 and two sides 10 extending from opposing peripheral edges of face 8. In this embodiment of the façade cassette, face 8 and sides 10 are vertically oriented.

Figure 3:
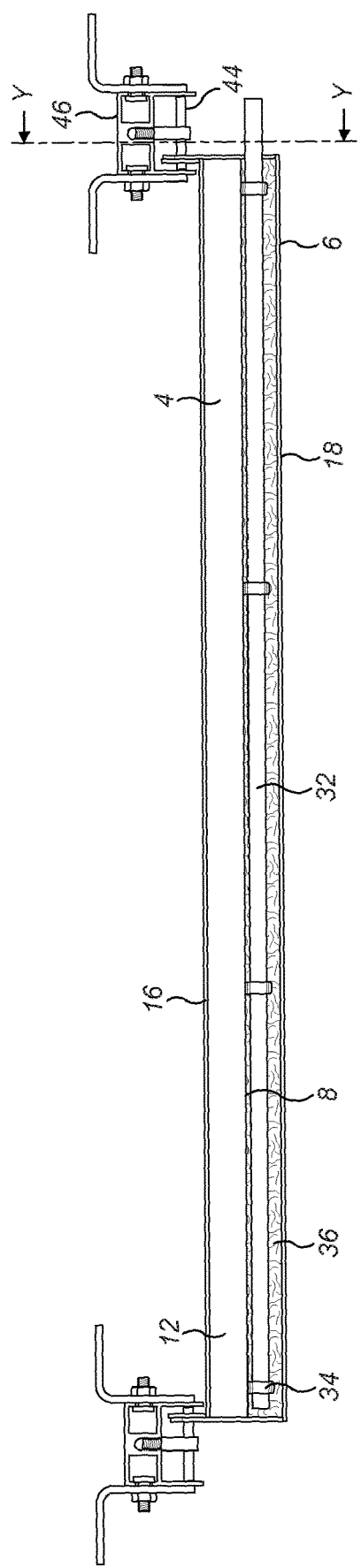
FIG. 3 is a top plan view of the façade cassette connected to a supporting structure.

Rear panel 4 also has an upper (first) side 12 and a lower (second) side 14, each extending from a peripheral edge of face 8. In this embodiment of the façade cassette, upper side 12 and lower side 14 are horizontally oriented. Upper side 12 is also shown in FIG. 3.

Upper side 12 has a lip portion 16 distal face 8 of the rear panel. Face 8, upper side 12 and lip portion 16 of the rear panel provide a step-shape in profile, as shown in FIG. 2.

The four sides of the rear panel extend between upper and lower corners of face 8 of the rear panel, such that a side extends along each peripheral edge of face 8.

Front panel 6 has a face 18 and two sides 20 extending from opposing peripheral edges of face 18. In this embodiment of the façade cassette, face 18 and the sides 20 are vertically oriented.

Front panel 6 also has a lower side 22 which extends from a peripheral edge of face 18 and, in this embodiment, is horizontally oriented. Lower side 22 extends between lower corners of face 18 and thus along a lower peripheral edge of face 18.

Lower side 22 extends towards a lower peripheral edge or a lower peripheral edge region of face 8 of rear panel 4 when front panel 6 is in the installed position. A gap is provided between lower side 22 and face 8 of the rear panel to enable water to move under gravity to a façade cassette positioned below. Alternatively, lower side 22 may be dimensioned to abut a lower peripheral edge or a lower peripheral edge region of face 8 of rear panel 4 when front panel 6 is in the installed position. In both embodiments, one or more openings may be provided in lower side 22 for water to pass through.

Sides 20 extend from the lower corners of face 18 towards the upper corners of the face 18, but do not reach the upper corners in this embodiment. Sides 20 preferably extend 75 to 100% of the distance from the lower corners of the face to the upper corners of face 18. Sides 20 therefore extend substantially along the whole length of the side peripheral edges of face 18.

Faces 8 and 18 are planar in this embodiment but one or both faces may have an alternative shape such as a curved shape, an angular shape or a wave shape, for example.

Face 18 of the front panel is provided with openings to allow vegetation to grow from within the façade cassette towards the outside environment. In this embodiment, the openings are perforations which are discussed in more detail below.

Figure 4:
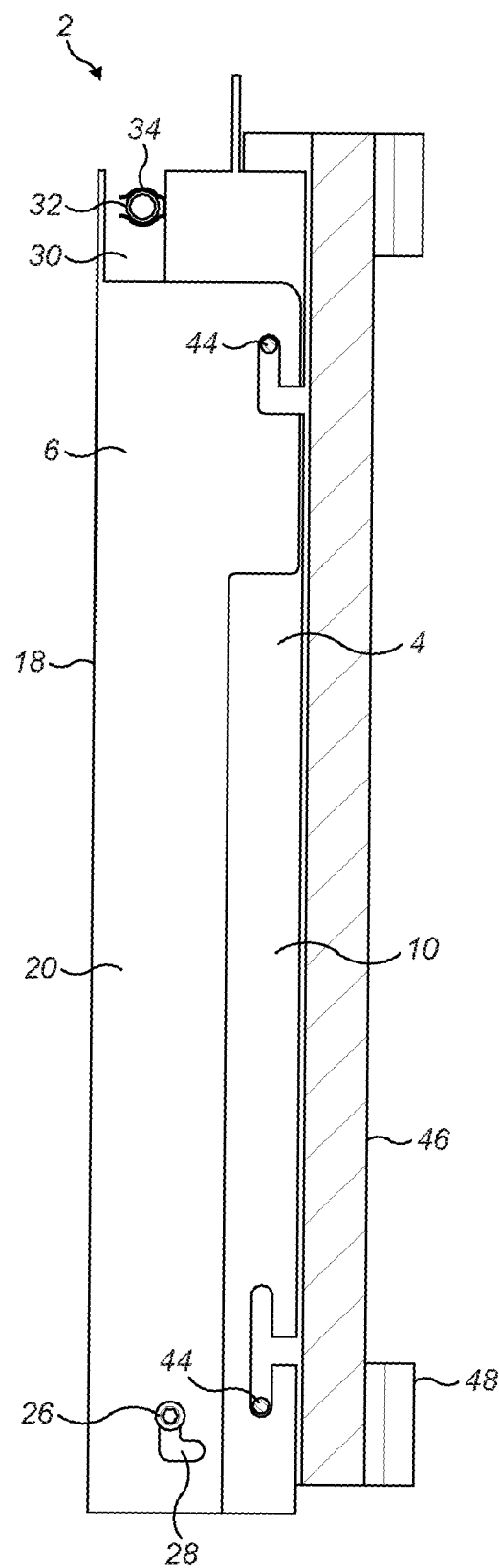
FIG. 4 is a cross-sectional view along line Y-Y of FIG. 3 with the front (second) panel in an installed position.
Figure 5:
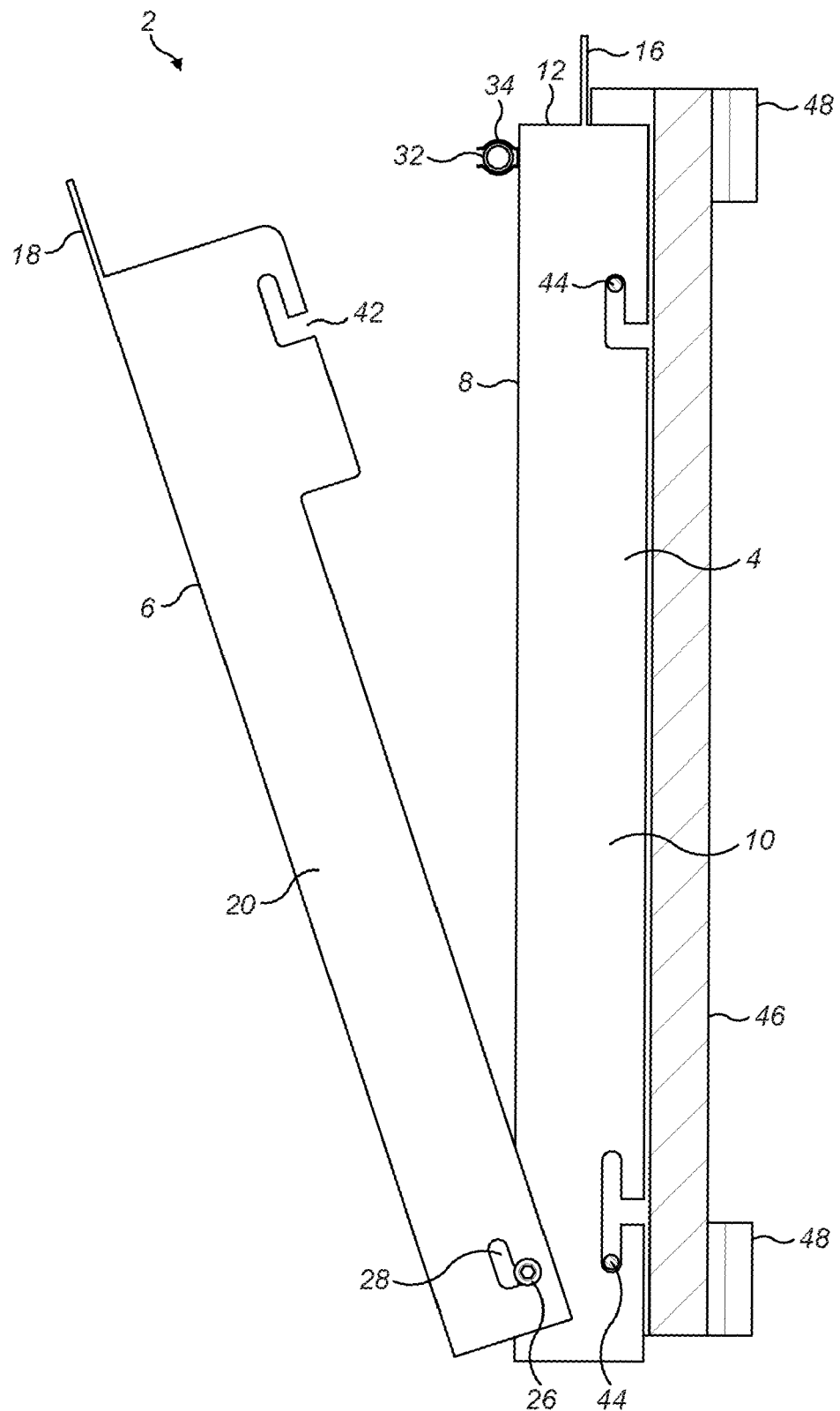
FIG. 5 is a cross-sectional view along line Y-Y of FIG. 3 with the front (second) panel in an open position.

Front panel 6 is mounted on rear panel 4 for movement between the installed position and the open position, these positions being shown in FIGS. 4 and 5.

In this embodiment, front panel 6 is mounted on rear panel 4 for translational and rotational movement between the installed position and the open position.

In this respect, front panel 6 is mounted on rear panel 4 by a pivoting means comprising two pivot members 26 each fixed to a lower end region of each opposing side 10 of rear panel 4. Pivot member 26 may be a screw which may be used with a washer when joining front panel 6 to rear panel 4.

The pivoting means also comprises a slot 28 provided in a lower end region of each opposing side 20 of front panel 6. Slot 28 is L-shaped in this embodiment with the toe of the L-shape pointing towards rear panel 4. Pivot member 26 is retained in slot 28 for translational movement of the front panel relative to the rear panel and for front panel 6 to pivot or hinge relative to rear panel 4 about an axis defined by the pivot member. The front panel is therefore mounted for movement about an axis extending through opposing sides 10 of rear panel 4 and opposing sides 20 of front panel 6.

Each opposing side 20 of front panel 6 is located adjacent to and externally of the respective one of opposing side 10 of rear panel 4 when front panel 6 is in the installed position.

A housing is defined between face 8 of the rear panel and face 18 and sides 20, 22 of the front panel. Moreover, a gap 30 is provided between the faces of the front panel and the rear panel when the front panel is in the installed position, the gap providing access to the housing for irrigation.

A pipe 32 is removably connected to face 8 of the rear panel using clips 34, the pipe extending along gap 30 adjacent a peripheral edge of face 8.

For larger-sized façade cassette, there may be additional rows of substantially horizontal pipes, with the substrate sub-divided or notched to allow the pipe to pass therethrough.

The housing of the façade cassette contains a substrate 36 in use of the façade cassette. The substrate provides a growth medium for vegetation and may be a root mat. A seed paper is attached to its front face, this seed paper being a thin layer of paper which is affixed to the front face of the substrate with a natural glue and biodegrades over time. Alternatively, the substrate may be impregnated with seeds (for example, to a depth of a few millimetres from its front face) or seeds may be glued onto its front face. The front face of the substrate is the face adjacent the openings in face 18 of front panel 6.

In another embodiment, the housing of the façade cassette contains the substrate 36 and pre-grown plants (for example, plug-in plants).

To allow the façade cassette to be connectable to a supporting structure, rear panel 4 and front panel 6 are provided with apertures in their respective opposing sides, as shown in FIGS. 1, 2, 4, 5 and 6.

Figure 6:
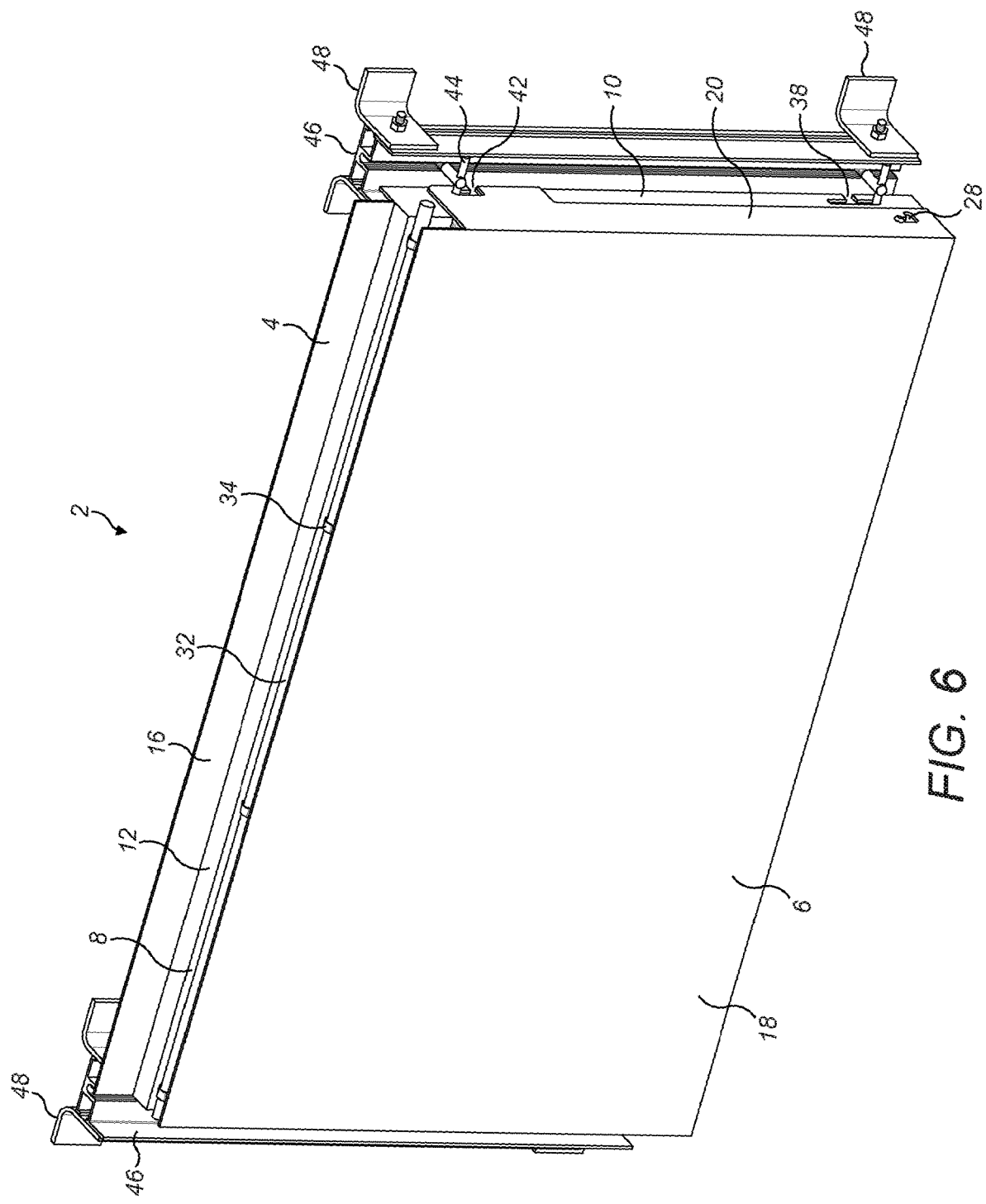
FIG. 6 is a front perspective view of the façade cassette connected to a supporting structure.

Rear panel 4 has two apertures in each of opposing sides 10, although one, three, four or more apertures are also envisaged (for example): each aperture is configured to hook onto the supporting structure in this embodiment, as shown in FIGS. 4 to 6, although a skilled person would understand that other means can be envisaged for connecting the rear panel to the supporting structure.

In this embodiment, a lower end region of each side 10 of rear panel 4 is provided with a T-shaped aperture 38 which extends to the vertical free edge of side 10. The aperture is not limited to this shape.

Also, an upper end region of each side 10 of rear panel 4 is provided with an L-shaped aperture 40 which extends to the vertical free edge of side 10. The aperture is not limited to this shape.

Front panel 6 has one aperture in each of opposing sides 20, although two, three, four or more apertures are also envisaged (for example): each aperture is configured to hook onto the supporting structure in this embodiment, when the front panel is in the installed position as shown in FIG. 4, although a skilled person would understand that other means can be envisaged for connecting the front panel to the supporting structure. In an alternative embodiment, the front panel is not connectable to the supporting structure: it is sufficient for only the rear panel to be connectable to the supporting structure since the front panel is mounted on the rear panel.

In the present embodiment, an upper end region of each side 20 of front panel 6 is provided with an L-shaped aperture 42 which extends to the vertical free edge of side 20. The aperture is not limited to this shape.

The L-shaped aperture hooks onto the supporting structure when the front panel is in the installed position and is unhooked from the supporting structure when the front panel is in the open position.

Referring to FIGS. 4 and 5, opposing sides 20 of the front panel are therefore releasably connected to the supporting structure in the installed position only.

When the front panel is in the installed position, the upper end region of each side 20 of the front panel is sufficiently wide to overlap and optionally cover the upper end region of adjacent side 10 of the rear panel.

The lower end region of each side 20 of the front panel is narrower in width than the upper end region of each side 20, in this embodiment. This is to prevent the lower end region of each side 20 from overlapping aperture 40 in side 10 of the rear panel. However, it is also envisaged that the lower end region of each side 20 is provided with means to releasably connect it to the rear panel or to the supporting structure, such that the lower end region need not be narrower in width than the upper end region of each side 20.

The supporting structure may be in the form of a sub-frame attached to the wall of a building, for example.

The sub-frame may comprise panel carriers 44, mullions 46 and brackets 48 such as those obtainable from façade companies. The shape and positions of the apertures in the sides of the front and rear panels are adjusted according to the dimensions and configuration of the sub-frame. Alternative means for connecting the façade cassette to a supporting structure may also require adjustment of the shape and positions of the connection means provided on the façade cassette, according to the dimensions and configuration of the sub-frame.

In this embodiment, each aperture is configured to hook onto panel carrier 44 which is mounted on mullion 46 which is fixed to bracket 48 which is attached to a wall. The panel carrier, mullion, bracket and wall form the supporting structure in this embodiment.

Figure 7:
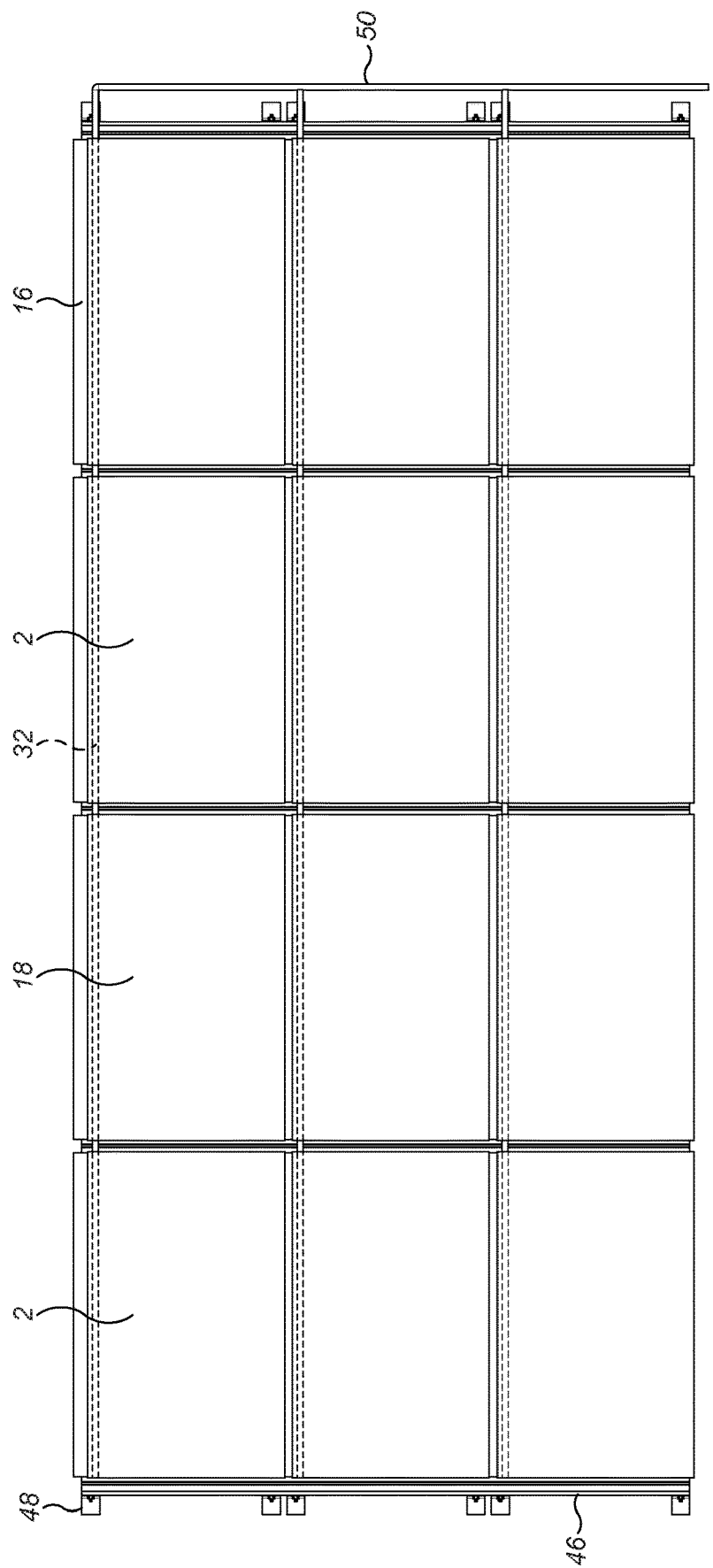
FIG. 7 is a front view of a façade system comprising a plurality of the façade cassettes.

Referring to FIG. 7, a façade system is assembled from a plurality of façade cassettes 2, the façade cassettes being positioned such that peripheral edges of the faces of the front panels are adjacent one another.

In the façade system, lip portion 16 is configured to overlap the lower side of the rear panel of a neighbouring façade cassette mounted above the lip portion to prevent the ingress of water behind the façade cassettes in use. Accordingly, lower side 14 of rear panel 4 is configured such that it is adjacent a lip portion of a neighbouring façade cassette mounted below the lower side.

Figure 8:
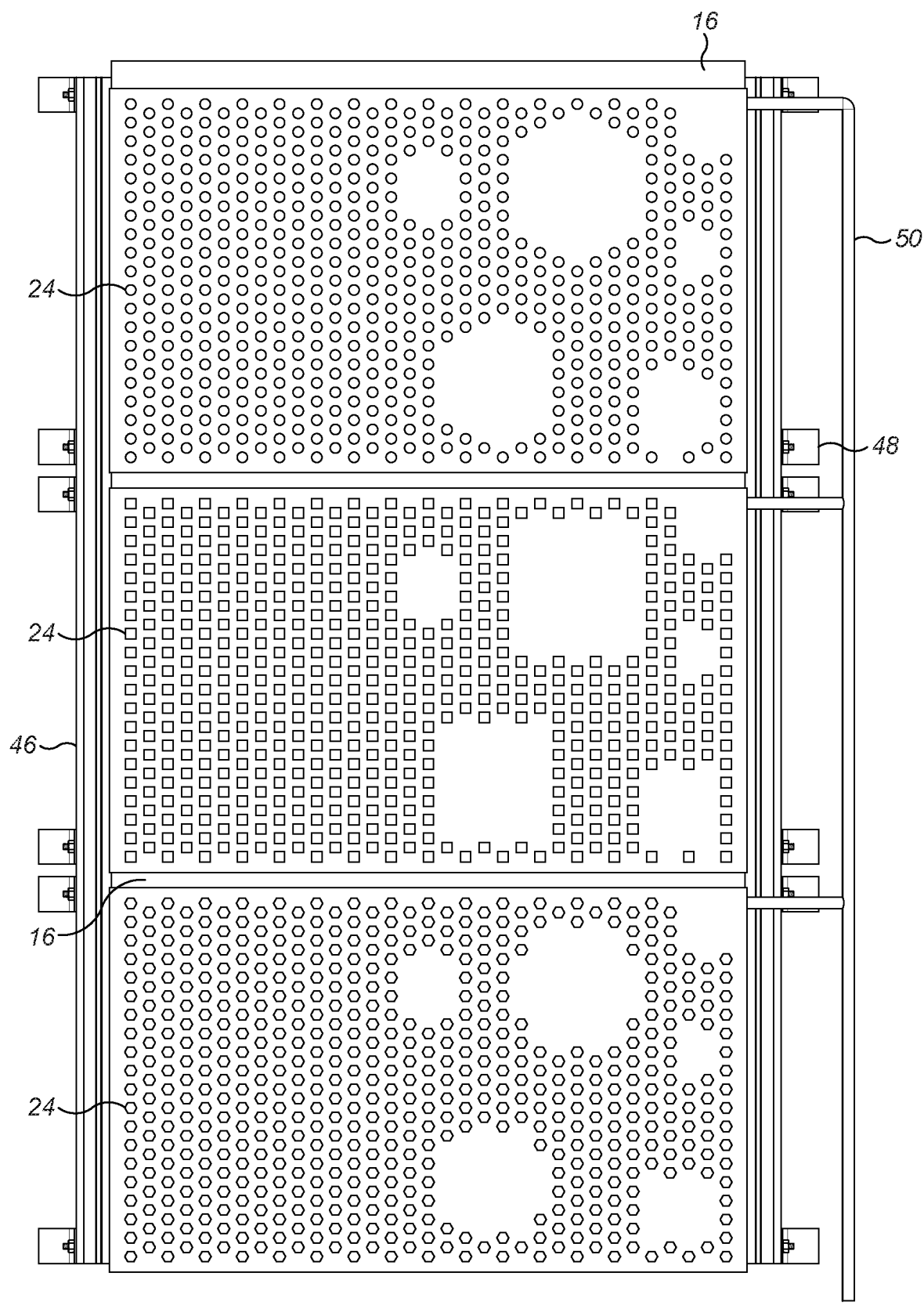
FIG. 8 is a front view of three façade cassettes with different perforation patterns in the front (second) panel.

In a method for installing the façade cassette or the façade system, apertures 38 and 40 of opposing sides 10 of rear panel 4 are hooked onto panel carriers 44. Substrate 36 may be pre-loaded into the housing of the façade cassette: if not, front panel 6 is moved into the open position for access to the housing and the substrate is placed therein either with seeds present or with pre-grown plants added: the front panel is then moved into the installation position. An irrigation apparatus 50 is provided to supply water to the substrate: in this embodiment, this involves clipping irrigation pipe 32 into the clips provided on face 8 of rear panel 4, irrigation pipe 32 forming part of irrigation apparatus 50 as shown in FIGS. 7 and 8. Irrigation apparatus 50 comprises irrigation pipe 32 as part of an irrigation pipe system, together with other components (not shown) such as pumps, water, tanks and dosing stations.

Water from irrigation pipe 32 of the façade cassette passes through substrate 36 in the housing: excess water may pass under gravity to an adjacent façade cassette positioned below or to a gutter located at the base of the façade system.

Once seeds in the housing have germinated, vegetation grows through perforations in face 18 of front panel 6 towards daylight or artificial light.

Referring to FIG. 8, perforations 24 in face 18 of front panel 6 may be designed to form regular or irregular patterns or may be designed to form islands of perforations or non-perforations, for example. FIG. 8 illustrates three different perforation designs in front panels 6. The vegetation will grow through the perforations accordingly, to form aesthetic patterns or designs. The perforations may be any suitable size and shape and are circular, square and hexagonal in the embodiments shown.

When pre-grown plants are provided in the housing of the façade cassette, the openings in the front panel 6 are sufficiently large for the vegetation to grow through. The openings in the front panel 6 may also be sufficiently large for pre-grown plants, such as plug-in plants, to be inserted into the housing through the openings in the front panel.

Figure 9A:
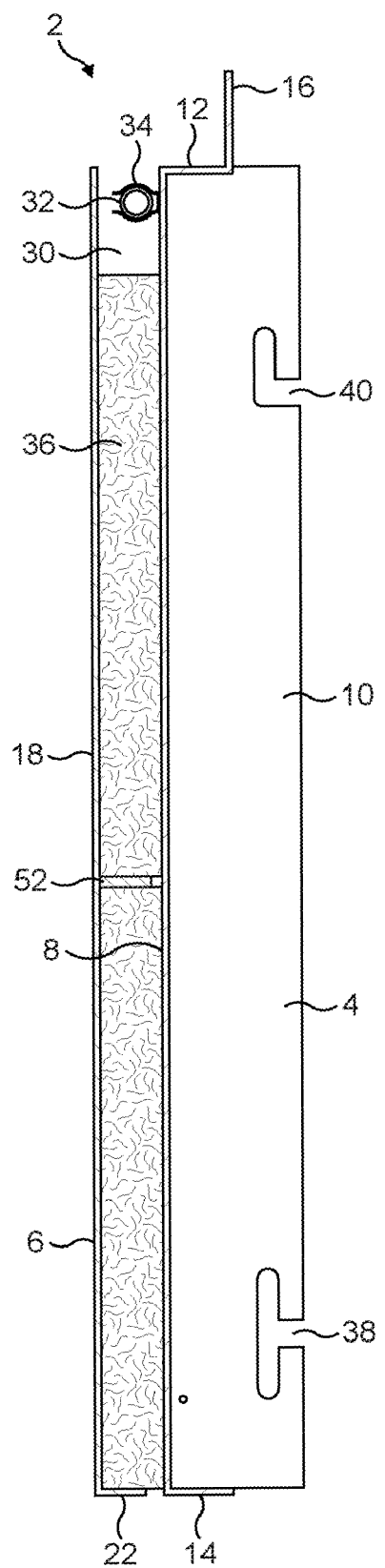
FIG. 9A is a cross-sectional view of a second embodiment of a façade cassette.
Figure 9B:
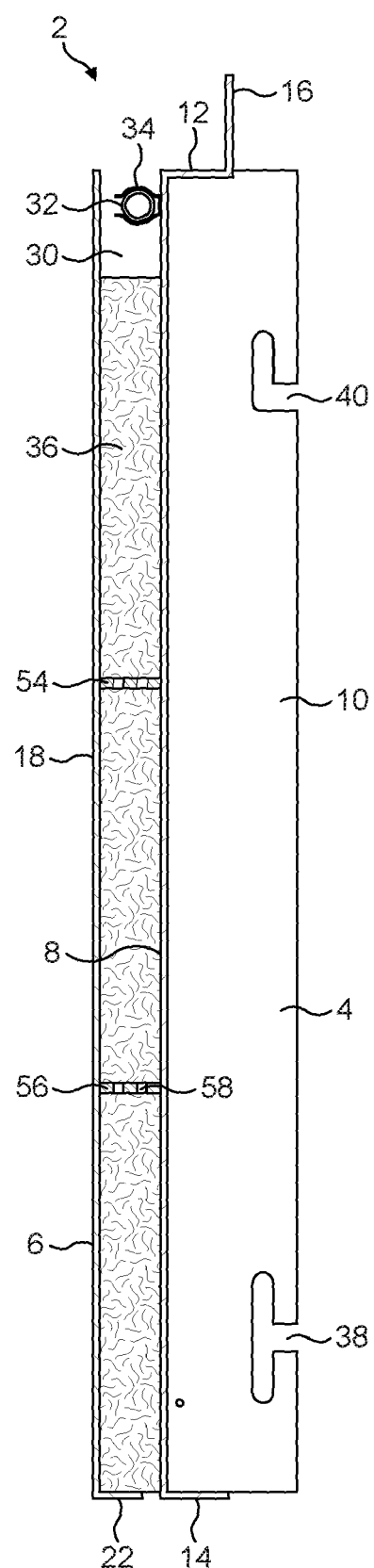
FIG. 9B is a cross-sectional view of a third embodiment of a façade cassette.

Referring to FIGS. 9A and 9B, the façade cassette may have one or more bars located in the housing and extending in a substantially horizontal direction. The bar(s) may be perforated and/or spaced from the face 18 of the front panel 6 and/or the face 8 of the rear panel 4, both to collect liquid inside the housing and to permit liquid to pass through the housing.

In the second embodiment of FIG. 9A, bar 52 is located in a central region of the housing, when the front panel 6 is in the installed position. Bar 52 is located approximately midway between upper and lower edges of the face 8 of the rear panel 4. Bar 52, in this embodiment, is also located approximately midway between upper and lower edges of the face 18 of the front panel 6. In this way, liquid is collected approximately halfway down the housing as well as at the bottom of the housing.

Bar 52 is spaced from the face 8 of the rear panel 4 to provide a channel for water to pass through. Bar 52, in this embodiment, is not spaced from the face 18 of the front panel 6.

In this second embodiment, the bar is solid and extends between the pair of opposing sides 20 of the front panel 6. It is fixed to these opposing sides.

In the third embodiment of FIG. 9B, two bars are located in the housing.

An upper bar 54 is located in an upper region of the housing, when the front panel 6 is in the installed position. This upper bar 54 is located approximately a third of the way down from the upper edge of the face 8 of the rear panel 4 to the lower 30 edge of the face 8 of the rear panel 4. In this embodiment, upper bar 54 is also located approximately a third of the way down from the upper edge of the face 18 of the front panel 6 to the lower edge of the face 18 of the front panel 6.

A lower bar 56 is located in a lower region of the housing, when the front panel 6 is in the installed position. This lower bar 56 is located approximately a third of the way up from the lower edge of the face 8 of the rear panel 4 to the upper edge of the face 8 of the rear panel 4. In this embodiment, the lower bar 56 is also located approximately a third of the way up from the lower edge of the face 18 of the front panel 6 to the upper edge of the face 18 of the front panel 6.

In this third embodiment, bars 54 and 56 are provided with apertures 58 for liquid to pass through. Each bar extends between the pair of opposing sides 20 of the front panel 6. It is fixed to these opposing sides. The width of each bar is substantially the same as the distance between the faces of the front and rear panels when the front panel 6 is in the installed position.

The invention claimed is:

1. A façade cassette for supporting vegetation growth, the façade cassette comprising:
   a first panel and a second panel which is provided with openings for vegetation to grow through, wherein:
   the first panel is connectable to a supporting structure;
   the second panel is mounted on the first panel for movement between an installed position and an open position;
   the first panel and the second panel are configured to define a housing therebetween for a substrate;
   each panel comprises a face and two sides extending from opposing peripheral regions of the face to provide a pair of opposing sides; and
   each side of the pair of opposing sides of the first panel is configured to be connectable to the supporting structure;
   wherein there is at least one aperture in each of the opposing sides of the first panel and the at least one aperture is configured to hook onto the supporting structure, or
   wherein there is at least one aperture in each of the opposing sides of the second panel and the at least one aperture is configured to hook onto the supporting structure.

2. The façade cassette as claimed in claim 1, wherein the second panel is mounted for movement about an axis extending through the pair of opposing sides of the first panel and the pair of opposing sides of the second panel.

3. The façade cassette as claimed in claim 2, wherein the second panel is mounted on the first panel by a pivoting means comprising a pivot member or pivot members extending along the axis and fixed to the opposing sides of either the first panel or the second panel, the pivoting means also comprising an aperture provided in each opposing side of the other of the first panel or the second panel.

4. The façade cassette as claimed in claim 1, wherein the pair of opposing sides of the second panel is connectable to the supporting structure in the installed position only.

5. The façade cassette as claimed in claim 1, wherein each of the opposing sides of the second panel is located adjacent to and externally of one of the opposing sides of the first panel when the second panel is in the installed position.

6. The façade cassette as claimed in claim 1, wherein the second panel is mounted on the first panel for rotational movement or for translational and rotational movement between the installed position and the open position.

7. The façade cassette as claimed in claim 1, wherein the housing is defined between the face of the first panel and the face and sides of the second panel.

8. A façade cassette as claimed in claim 1, wherein a gap is provided between the faces of the first panel and the second panel when the second panel is in the installed position, the gap providing access to the housing for irrigation.

9. The façade cassette as claimed in claim 1 comprising at least one fluid conduit and/or comprising a substrate located in the housing.

10. The façade cassette as claimed in claim 1 comprising at least one bar located in the housing, the or each bar extending lengthwise in a direction which extends between the pair of opposing sides of the second panel in the installed position.

11. The façade cassette as claimed in claim 1, wherein the first panel comprises a first side extending from a peripheral region of the face and located between the pair of opposing sides of the first panel, the first side having a lip portion distal the face of the first panel.

12. The façade system comprising a plurality of the façade cassettes as claimed in claim 1, wherein the façade cassettes are positioned such that peripheral edges of the faces of the second panels are adjacent one another.

13. A method for installing the façade cassette or façade system of claim 1, the method comprising:
- connecting at least the first panel of the façade cassette to a supporting structure;
- placing a substrate in the housing of the façade cassette; and
- providing an irrigation apparatus to supply water to the substrate.

* * * * *